United States Patent [19]

Eliason et al.

[11] Patent Number: 4,463,994

[45] Date of Patent: Aug. 7, 1984

[54] SPLIT INNER RACE BEARING

[75] Inventors: Robbin D. Eliason, Pomfret Center; Claude P. Rotondo, Middletown, both of Conn.

[73] Assignee: United Technologies Corporation, Hartford, Conn.

[21] Appl. No.: 360,255

[22] Filed: Mar. 22, 1982

[51] Int. Cl.³ .......................... F16C 33/60; F16C 33/10
[52] U.S. Cl. ...................................... 308/196; 308/187
[58] Field of Search ................... 308/196, 187, 189 R, 308/188, 216, 189 A

[56] References Cited

U.S. PATENT DOCUMENTS

| 3,504,955 | 4/1970 | Bailey | 308/187 X |
| 3,528,711 | 9/1970 | Atkinson | 308/187 |
| 3,915,521 | 10/1975 | Young | 308/196 X |
| 4,194,797 | 3/1980 | Hörmann et al. | 308/187 |
| 4,334,720 | 6/1982 | Signer | 308/187 |

Primary Examiner—Stanley N. Gilreath
Assistant Examiner—Thomas R. Hannon
Attorney, Agent, or Firm—Stephen E. Revis

[57] ABSTRACT

A first half of a split inner race for a bearing includes axial grooves in its inner circumferential surface which carry oil across an axially extending lip to an annular trough disposed radially outwardly thereof in the other half of the bearing race, the lip overhanging the trough. The trough feeds axial passageways which carry the oil to the far side of the said other race half, such as for cooling a seal plate adjacent to the bearing. The first race half also includes second axial grooves along its inner circumferential surface which are intersected by radial slots in the inner race at the interface between the race halves. Oil flowing in these second axial grooves does not reach the annular trough in the second race half, but instead is flung radially outwardly to the rolling elements via the radial slots. This split inner race construction provides a distribution of oil flow between the rolling elements and, for example, a seal plate, which is substantially independent of bearing speed and angular orientation of the race halves.

3 Claims, 4 Drawing Figures

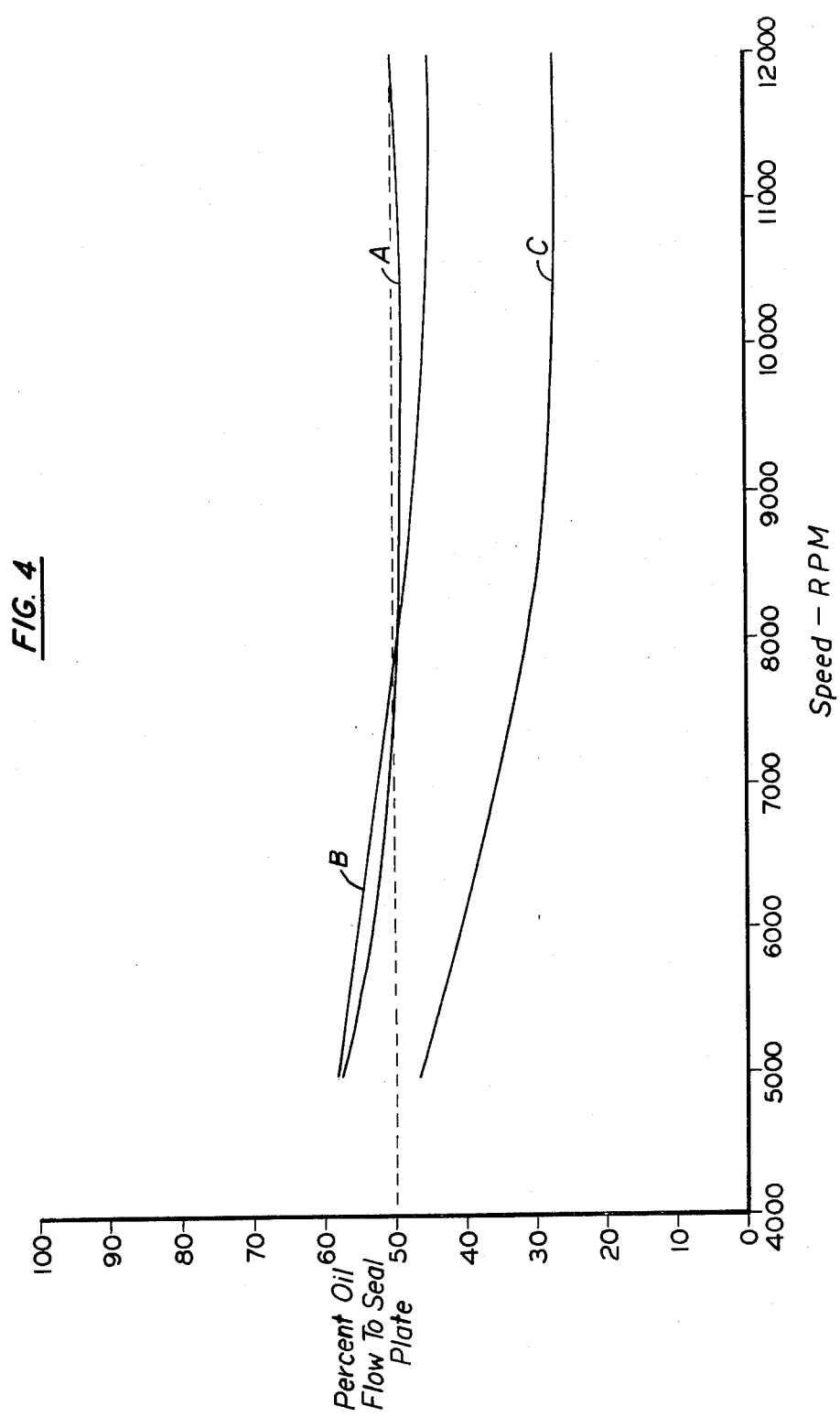

SPLIT INNER RACE BEARING

DESCRIPTION

1. Technical Field

This invention relates to bearings and more particularly to the feeding of oil to bearings.

2. Background Art

Bearings for supporting rotating shafts, such as a rotor shaft in a gas turbine engine, are typically cooled with oil which is circulated within a sealed bearing compartment. Carbon face seals are often used at the interface between stationary and rotating structure in defining these sealed compartments. The stationary carbon face seal rubs against a seal plate which is adjacent to and rotates with the bearing. The seal plate is cooled during operation by passing oil through passageways within the seal plate.

It is sometimes desirable or necessary to cool both the bearing rolling elements and the seal plate using oil from a single source. One known technique is to feed the oil from one side of the bearing inner race to the seal plate on the other side of the inner race by means of axial grooves or passageways through the inner race. Some of the oil flowing within these passageways is bled off to the rolling elements via radial passageways in the inner race which intersect some of the axial passageways.

Some bearings are designed with a split inner race (i.e., front and rear race halves). Those bearings may have axial grooves disposed along the inner circumferential surface of one race half intersecting and feeding oil to an annular trough formed in the race at the juncture between the two halves. The annular trough distributes the oil to the rolling elements via radial passageways in the inner race which communicate with the trough. A portion of the oil in the trough is directed axially to a seal plate on the other side of the second half of the inner race via axial passageways through the second half which intersect with and are fed oil from the trough.

The foregoing techniques have not been totally satisfactory in that flow split between the rolling elements and seal plate is affected by bearing rotational speed. At high speeds the centrifugal forces may be so large as to draw all the oil through the radial slots, effectively starving the seal plate of oil. Maintaining a constant flow split at all speeds may or may not be important depending upon the bearing application.

Commonly owned U.S. Pat. No. 3,915,521 to H. J. Young is a split inner race bearing assembly which is designed to distribute oil, in accordance with a fixed ratio, between the rolling elements and a seal plate. The construction uses an interrupted circumferential groove at the interface of the race halves to isolate oil which is to be passed axially through the inner race to a seal plate from oil which is to be fed to the rolling elements via radial slots defined between the race halves. It is also an object of that design to maintain substantially the same flow split regardless of the angular alignment of the two race halves. As will be discussed hereinafter, in one particular series of tests requiring a bearing designed to yield a 50/50 split of oil between the rolling elements and a seal plate, a bearing constructed in accordance with the teaching of the Young patent provided an oil split which was somewhat speed dependent over a wide range of speeds, and was also dependent on the angular alignment of the race halves.

DISCLOSURE OF INVENTION

One object of the present invention is a split inner race bearing with positive means for distributing oil between the rolling elements and an adjacent seal plate at a fixed ratio.

Another object of the present invention is means for distributing oil in a desired ratio between the bearing rolling elements and a seal plate adjacent the bearing, wherein the ratio of the oil split is minimally affected by bearing rotational speed.

A further object of the present invention is a split inner race bearing wherein the oil split between the rolling elements and a seal plate adjacent the bearing is unaffected by the angular alignment of the race halves.

According to the present invention a first inner race half of a split inner race bearing includes first axial grooves in its inner circumferential surface which carry oil over the interface between the two race halves and into an annular trough formed in the second race half, wherein the trough feeds oil to passageways in the second race half leading to the far face of the second race, and the first race also includes second axial grooves along its inner circumferential surface which are intersected by radial slots in the inner race at the interface between the race halves for directing oil from these intersected axial grooves to an outer circumferential surface of the inner race.

More specifically, an annular, axially facing surface of the first race, which contacts an oppositely facing surface of the second race, includes a lip extending axially outwardly therefrom near or at its innermost diameter. The lip overhangs an annular trough in the inner circumferential surface of the second race. First axial grooves in the inner circumferential surface of the first race extend axially through the lip and carry oil over the interface between the race halves to the annular trough in the second race. The oil in the trough feeds passageways in the second race which direct it to a seal plate axially adjacent the second race.

Second axial grooves in the inner circumferential surface of the first race may or may not extend past the interface between the race halves. They are, however, interrupted or intersected by radial slots at the interface such that oil flowing axially in these grooves is redirected through the radial slots by centrifugal force to an outer circumferential surface of the inner race. That oil cools and lubricates the rolling elements.

In this invention if the first and second axial grooves are the same cross-sectional size, the flow split will be determined by the ratio of the number of first to second axial grooves. Furthermore, testing has confirmed that the flow split of a bearing assembly according to the present invention is somewhat affected by rotational speed only at lower speeds, and is virtually unaffected by the angular orientation of the inner race halves relative to each other.

The foregoing and other objects, features and advantages of the present invention will become more apparent in the light of the following detailed description of preferred embodiments thereof.

BRIEF DESCRIPTION OF THE DRAWING

FIG. 4 is a graph showing the effect of bearing rotational speed on the oil flow split provided by bearing inner races designed according to the present invention and according to the prior art.

BEST MODE FOR CARRYING OUT THE INVENTION

Figure 1:
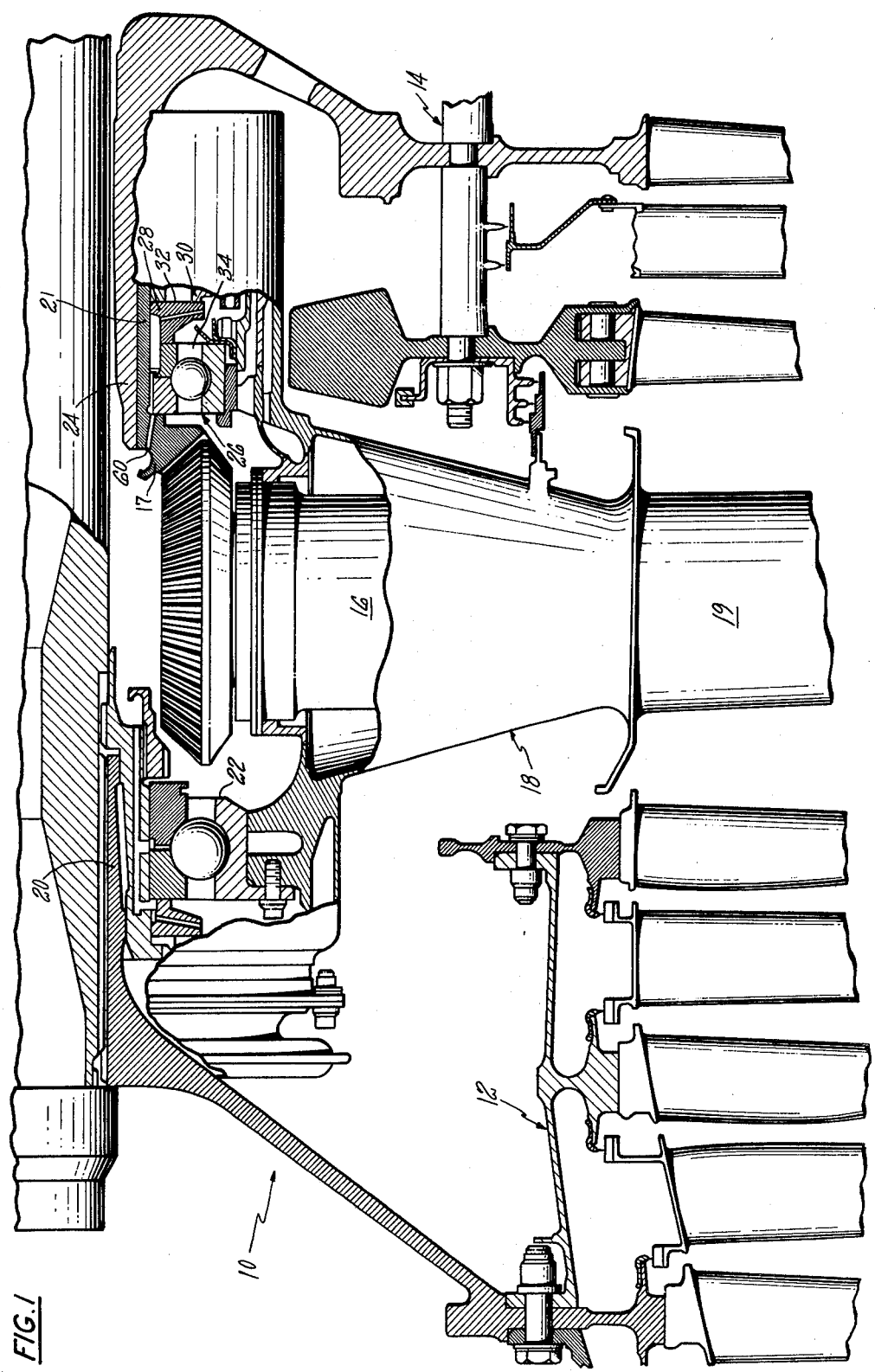
FIG. 1 is a simplified partial cross-sectional view of a portion of the low and high compressors of a gas turbine engine, including apparatus for supporting the compressors.

As an exemplary embodiment of the present invention consider FIG. 1 which is a simplified partial cross section of a portion of a gas turbine engine 10. Shown in FIG. 1 is the rear portion of a low compressor 12, the forward portion of a high compressor 14, and static structure 18 which includes a hollow strut 19. The upper portion of a gearbox drive shaft assembly 16 passes through the strut 19, and engages a gear 17 formed on one end of an axially extending gear shaft 21. A shaft 20 of the low compressor 12 is supported by a bearing 22 which rests on a portion of the static structure 18. A shaft 24 of the high compressor is splined to the gear shaft 21 and is radially supported at its forward end by a bearing 26, which also rests on a portion of the static structure 18. The rear end of the high compressor is not shown, but is supported by bearings in a customary manner.

A seal plate 28 is disposed axially adjacent the bearing 26. The seal plate 28 is fixed relative to the gear shaft 21 and high compressor shaft 24 and rotates with the bearing. A carbon face seal 30 is secured to static structure 18 and is spring loaded such that it bears against the surface 32 of the seal plate 28 providing a seal which prevents excess air from entering the bearing compartment 34.

Figure 2:
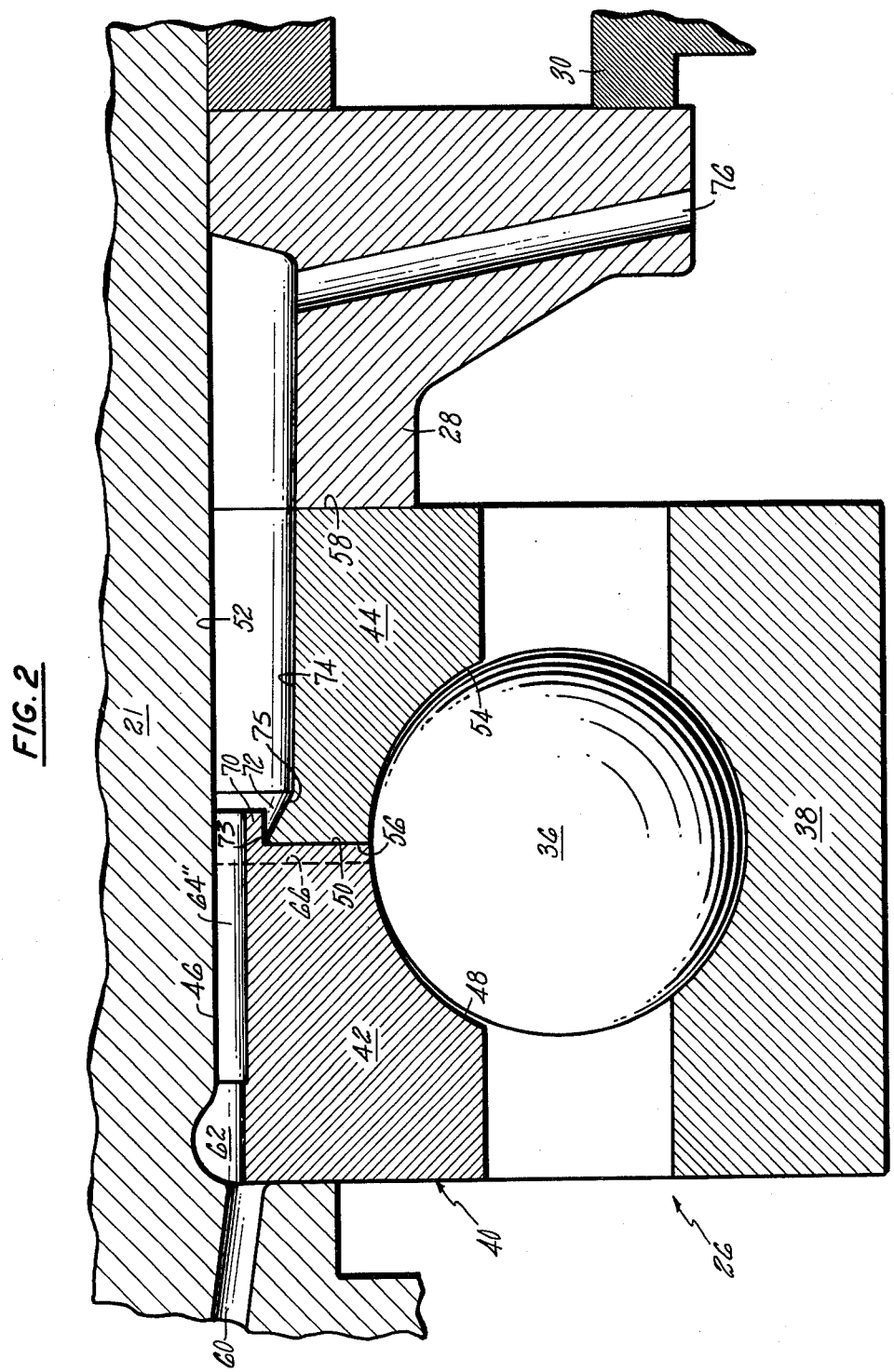
FIG. 2 is a simplified, enlarged cross-sectional view of the high compressor thrust bearing of FIG. 1.
Figure 3:
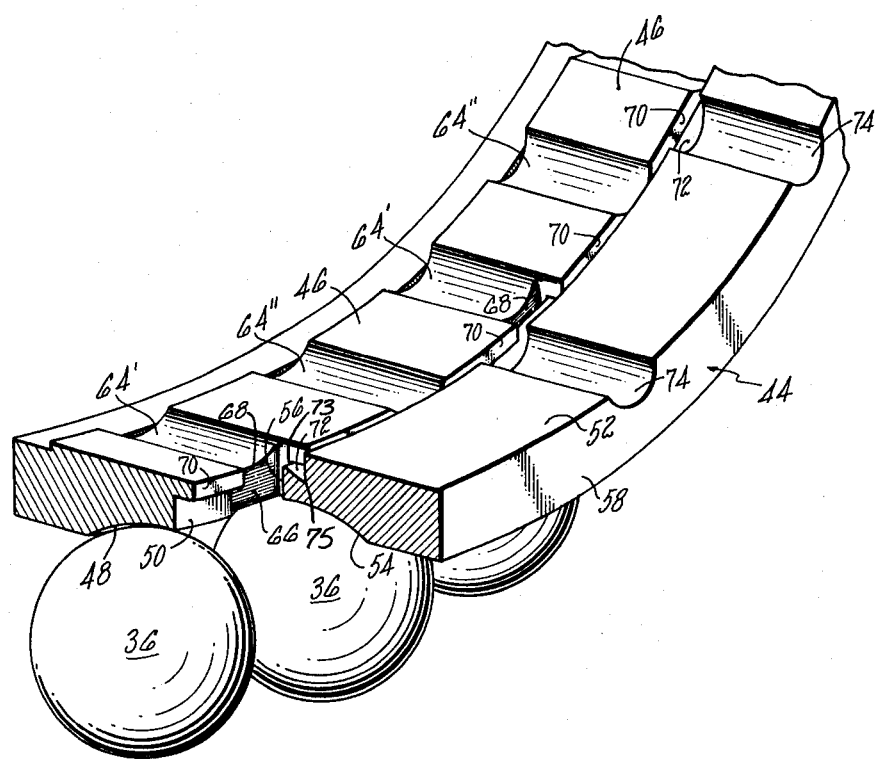
FIG. 3 is a simplified, enlarged perspective view of a portion of the split inner race of the bearing of FIG. 2.

Referring to FIGS. 2 and 3, the bearing 26 comprises a plurality of balls 36 trapped between an outer annular race 38 and an inner annular race 40. The inner annular race is a split race comprising a front half 42 and a rear half 44. The front race half 42 has an inner circumferential surface 46, an outer circumferential surface 48, and a rearwardly facing, radially extending annular surface 50. The rear race half 44 includes an inner circumferential surface 52, an outer circumferential surface 54, a forwardly facing, radially extending annular surface 56, and a rearwardly facing, radially extending annular surface 58. The rearwardly facing surface 50 of the front race half 42 is contiguous with the forwardly facing surface 56 of the rear race half 44. The seal plate 28 sealingly abuts the rearwardly facing surface 58 of the rear race half 44.

In this embodiment oil is brought to the bearing 26 through a plurality of passages 60 which feed an annulus 62 formed between the gear shaft 21 and the bearing front race half 42. The inner circumferential surface 46 of the front race half 42 includes a plurality of axially extending grooves 64' (FIG. 3) which communicate with the annulus 62, are circumferentially spaced apart, and terminate at the surface 50. The surface 50 includes a plurality of circumferentially spaced apart radial slots 66, each of which intersects one of said grooves 64', as at 68, and extends radially to the inner circumferential surface 48. Oil fed to the grooves 64' is flung radially outwardly by centrifugal force to the balls 36 via the radial slots 66 during operation of the bearing.

The inner circumferential surface 46 of the front race half 42 also includes axial grooves 64" which alternate with the grooves 64'. The grooves 64" extend past the surface 50 across lips 70 which protrude axially outwardly from the surface 50 proximate the inner circumferential surface 46 of the front race half 42. The lips 70 overhang the rear race half 44 and have their downstream ends radially aligned with an annular trough 72 disposed radially outwardly therefrom in the rear race half 44. The edge 73 of the trough 72, which edge is radially aligned with the lips 70, is located radially inwardly of the base 75 of the trough 72. Grooves 74 in the inner circumferential surface 52 of the rear race half 44 extend axially from the annular trough 72 to the rearwardly facing surface 58.

In operation, oil fed to the grooves 64" from the annulus 62 is carried across the interface between the contiguous surfaces 50, 56 of the race halves and into the trough 72. The grooves 74, which could equally as well be drilled axial holes which communicate with the trough 72, carry oil from the trough 72 across the rear race half 44 to the seal plate 28, whereupon it travels radially outwardly through passages 76 in the seal plate to cool the seal plate and the adjacent carbon face seal 30.

Assuming the cross-sectional area of the grooves 64' and 64" in the front race half 42 are identical, the oil split between the balls 36 and the seal plate 28 will be the ratio of the number of grooves 64' to the number of grooves 64". In the embodiment shown there are an equal number of each, and an approximately equal amount of oil will flow to the balls 36 and to the seal plate 28. This flow split has been determined to be substantially independent of bearing speed (except at low speeds) and independent of the angular orientation of the front race half 42 relative to the rear race half 44.

Some tests were run to confirm the independence of the oil split from rotational speed and angular orientation of race halves designed according to the present invention. For comparison purposes, a bearing inner race design incorporating the features of the aforementioned Young U.S. Pat. No. 3,915,521 was also built and tested. The results of those tests are shown in the graph of FIG. 4.

The split inner race design used to obtain curve A of FIG. 4 was similar to that shown in FIG. 3, and was designed to direct 50% of the oil to the seal plate. In the front race half there were an equal number of equally spaced apart grooves 64', 64"; and in the rear race half there were half the total number of grooves 74 as in the front race half. The race halves were tested with two different angular alignments. In one test run the grooves 64' were aligned with the grooves 74, and in another test run the grooves 64" were aligned with the grooves 74. Virtually identical results were obtained in each case, as represented by the single curve A. Thus, the percent of oil flowing to the seal plate was the same in each configuration at all bearing speeds. Furthermore, it is also clear from the graph of FIG. 4, that at bearing speeds of from about 6,250 to 12,000 RPM, the percent of oil to the seal plate was within about 2% of the predicted and desired 50%. Only at speeds below 6,250 RPM did the speed appear to have a significant effect on the oil split.

In the prior art Young et al design which was tested, the front and rear race halves each had an equivalent number of equally spaced apart axial grooves. Alternate axial grooves in the front race half intersected an interrupted circumferential groove at the mating faces, while the other grooves in the front race half did not, and were intercepted by a radial slot at the mating faces. The axial grooves had the same cross-sectional size; and it was intended that 50% of the oil flow axially across both race halves, while the remaining 50% of the oil flow through the radial slots. Two different angular orientations of the front and rear race halves were tested. Curve B represents the test results wherein each axial groove in the front race half was aligned with an axial groove in the rear race half. Curve C represents the results of an orientation wherein each of the axial grooves in the front race half were aligned midway between the axial grooves in the rear race half. It is apparent from the great displacement of curve B from curve C that the oil split was significantly affected by the angular orientation of the race halves. Note that in the second of the above-described orientations (curve C) less than 30% of the oil flowed to the seal plate at rotational speeds of 8,250 to 12,000 RPM. Furthermore, the bearing speed had a considerably greater effect on the oil flow split in both angular orientations than it did for either of the tested angular orientations of the race halves in the bearing constructed according to the present invention.

It is believed that some of the problems associated with the tests of the Young bearing design were precipitated by the small diameter of the bearing race being tested (about a four inch I.D.) coupled with the required oil flow rates for the particular application. In any event, the bearing race design of the present invention did not have such problems, which is a clear improvement over the prior art. Thus, the advantages of the present invention over the prior art are mainly in its ability to provide a positive, relatively constant radial and axial oil flow split over a wide range of bearing speeds regardless of the angular orientation of the race halves and the size of the bearing.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A bearing which comprises:
   a split inner race including a first annular race half and a second annular race half axially adjacent said first race half;
   said second race half having generally radially extending first and second opposed surfaces;
   said first race half having an outer circumferential surface, an inner circumferential surface, and a generally radially extending surface contiguous with said first surface of said second race half and including lip means extending axially outwardly therefrom proximate said inner circumferential surface thereof;
   said inner circumferential surface of said first race half having a plurality of circumferentially spaced apart axial grooves therein, and said radially extending surface of said first race half having a plurality of circumferentially spaced apart radial slots therein each intersecting one of said axial grooves and extending from said intersected axial groove to said outer circumferential surface, wherein at least a first plurality of said axial grooves do not intersect said radial slots and extend axially across said lip means; and
   said second race half including an annular trough having a base and an edge, said edge being located radially inwardly of said base, and said trough, including said trough edge, being radially aligned with and disposed radially outwardly of said lip means for receiving fluid from said first plurality of axial grooves, said second race half also including a plurality of fluid carrying passageways in communication with said trough and extending from said trough to said second surface.

2. The bearing according to claim 1 wherein every other of said axial grooves in said first race half is intersected by one of said radial slots.

3. The bearing according to claim 1 or 2 wherein the cross-sectional areas of said axial grooves in said first race half are equal.

* * * * *